(12) United States Patent
Cassidy (10) Patent No.: US 10,364,906 B1
(45) Date of Patent: Jul. 30, 2019

(54) DIELECTRIC REGULATOR

(71) Applicant: Engineered Controls International, LLC, Elon, NC (US)

(72) Inventor: Thad Cassidy, Statesville, NC (US)

(73) Assignee: Engineered Controls International, LLC, Elon, NC (US)

( * ) Notice: Subject to any disclaimer, the term of this patent is extended or adjusted under 35 U.S.C. 154(b) by 0 days.

(21) Appl. No.: 15/639,967

(22) Filed: Jun. 30, 2017

Related U.S. Application Data (60) Provisional application No. 62/361,617, filed on Jul. 13, 2016.

(51) Int. Cl.
 *F16K 27/02* (2006.01)
 *G05D 16/06* (2006.01)

(52) U.S. Cl.
 CPC ........... *F16K 27/02* (2013.01); *G05D 16/063* (2013.01); *G05D 16/0691* (2013.01); *Y10T 137/7782* (2015.04); *Y10T 137/782* (2015.04); *Y10T 137/783* (2015.04); *Y10T 137/7823* (2015.04); *Y10T 137/7831* (2015.04)

(58) Field of Classification Search
 CPC .. F16K 27/02; G05D 16/063; G05D 16/0691; Y10T 137/7831; Y10T 137/7782; Y10T 137/783; Y10T 137/7823; Y10T 137/782
 See application file for complete search history.

(56) References Cited

U.S. PATENT DOCUMENTS

| | | | |
|---|---|---|---|
| 1,574,690 A | 2/1926 | Radabaugh | |
| 1,862,153 A | 6/1932 | Lee | |
| 2,161,544 A * | 6/1939 | Baker | G05D 16/0663 137/505.35 |

(Continued)

FOREIGN PATENT DOCUMENTS

| | | | | |
|---|---|---|---|---|
| FR | 2044102 A5 | * | 2/1971 | ......... G05F 16/0691 |
| GB | 2054207 A | * | 2/1981 | ............... A62B 7/04 |
| GB | 2360348 A | * | 9/2001 | ......... G05D 16/0691 |

OTHER PUBLICATIONS

Dielectric Union for Propane, Multiple Male x Flare Connections, Jomar Valve, 2016.

*Primary Examiner* — Matthew W Jellett
*Assistant Examiner* — Christopher D Ballman
(74) *Attorney, Agent, or Firm* — Neal, Gerber & Eisenberg LLP (57) ABSTRACT

A dielectric regulator comprises a regulator and an inlet group. The inlet group comprises: an inlet nozzle assembly and an inlet fitting. The inlet nozzle assembly comprises: a nozzle, a bushing, a first sealing ring, a second sealing ring, a nut, a first dielectric interface, and a second dielectric interface. The nozzle defines a sealing block void, a funnel void, a first cylindrical void, and a polygonal void. The bushing surrounds the nozzle and compresses the first sealing ring between the nozzle and the bushing. The second sealing ring surrounds the nozzle and compressed via the nozzle and the bushing. The first dielectric interface is ring-shaped and is compressed via the nut and the nozzle. The second dielectric interface is ring shaped and is compressed via the nozzle and the inlet fitting. The inlet fitting defines a central void and is threadably engaged with the nozzle assembly via the nut.

20 Claims, 9 Drawing Sheets

(56) References Cited

U.S. PATENT DOCUMENTS

| | | | | |
|---|---|---|---|---|
| 2,258,295 A * | 10/1941 | Merz | ............... | F16K 27/02 137/505.36 |
| 2,335,935 A * | 12/1943 | Hanley | ............... | F24F 6/12 137/505.29 |
| 2,653,834 A | 9/1953 | Purkhiser | | |
| 3,018,119 A | 1/1962 | Champion | | |
| 3,077,638 A | 2/1963 | Hickam | | |
| 3,126,194 A * | 3/1964 | Franck | ............... | F16K 27/02 251/148 |
| 3,782,419 A | 1/1974 | Hanson | | |
| 3,861,719 A | 1/1975 | Hand | | |
| 3,937,496 A | 2/1976 | Zahid | | |
| 4,043,357 A * | 8/1977 | Gocke | ............... | F16K 31/524 137/495 |
| 4,595,218 A | 6/1986 | Carr et al. | | |
| 4,654,747 A | 3/1987 | Covey | | |
| 4,776,600 A | 10/1988 | Kohn | | |
| 5,078,431 A | 1/1992 | Hale | | |
| 5,340,161 A | 8/1994 | Bagnulo | | |
| 5,366,257 A | 11/1994 | McPherson et al. | | |
| 5,447,340 A | 9/1995 | Sands et al. | | |
| 5,588,682 A | 12/1996 | Breese | | |
| 5,628,532 A | 5/1997 | Ashcraft | | |
| 5,678,866 A | 10/1997 | Mina | | |
| 5,735,306 A | 4/1998 | Olds et al. | | |
| 5,973,903 A | 10/1999 | Tomerlin | | |
| 6,186,558 B1 | 2/2001 | Komolrochanaporn | | |
| 6,286,875 B1 | 9/2001 | Snodgrass et al. | | |
| 6,431,205 B1 | 8/2002 | Bartos | | |
| 6,904,944 B2 | 6/2005 | Satou et al. | | |
| 6,979,028 B2 | 12/2005 | Muroi et al. | | |
| 7,458,613 B2 | 12/2008 | Spears | | |
| 7,604,217 B2 | 10/2009 | Lum | | |
| 7,762,528 B2 | 7/2010 | Butruille | | |
| 9,169,953 B2 | 10/2015 | Cavagna | | |
| 9,664,302 B2 * | 5/2017 | Fukushima | ............... | F16K 35/00 |
| 2001/0037829 A1 | 11/2001 | Shaw et al. | | |
| 2006/0099843 A1 | 5/2006 | Fullner et al. | | |
| 2007/0272313 A1 | 11/2007 | Olds | | |
| 2008/0099070 A1 * | 5/2008 | Luongo | ............... | F16K 27/02 137/15.18 |
| 2010/0187816 A1 | 7/2010 | Lum | | |
| 2011/0073201 A1 | 3/2011 | Matsui et al. | | |
| 2013/0146157 A1 | 6/2013 | Hsiao | | |
| 2013/0187075 A1 | 7/2013 | Craig | | |

* cited by examiner

DIELECTRIC REGULATOR

CROSS REFERENCE

This application claims the benefit of U.S. Provisional Pat. App. No. 62/361,617 filed on Jul. 13, 2016. The contents of this prior application are incorporated herein by reference in their entirety.

TECHNICAL FIELD

This invention relates to regulators that intake a stream of varying pressure and output a stream of constant pressure.

BACKGROUND

Prior art regulators are configured to intake variable pressure fluid and supply the fluid at a constant pressure. These regulators often intake the variable pressure fluid from a utility line, such as a natural gas utility line. Because the regulators are typically metallic, the regulators are capable of transmitting electrical energy to and/or receiving electrical energy from the utility line. This electrical energy may ignite fluid inside of the regulator and/or the utility line.

SUMMARY

In a first example, a dielectric regulator comprises a regulator and an inlet group. The inlet group comprises an inlet nozzle assembly and an inlet fitting. The inlet nozzle assembly comprises a nozzle, a bushing, a first sealing ring, a second sealing ring, a nut, a first dielectric interface, and a second dielectric interface. The nozzle defines a sealing block void, a funnel void, a first cylindrical void, and a polygonal void. The bushing surrounds a first outer perimeter of the nozzle and compresses the first sealing ring between the first outer perimeter of the nozzle and the bushing. The second sealing ring surrounds a second outer perimeter of the nozzle and is in compressive contact with the second outer perimeter of the nozzle and the bushing. The first dielectric interface is ring-shaped and is compressed via the nut and the nozzle. The second dielectric interface is ring shaped and is compressed via the nozzle and an inlet fitting. The inlet fitting defines a central void and is threadably attached to the inlet nozzle assembly via the nut.

In a second example, dielectric regulator comprises: a regulator and an inlet group. The regulator comprises a body and a sealing tip. The body has an inlet. The sealing tip is disposed in the inlet. The inlet group comprises a nozzle assembly and an inlet fitting. The nozzle assembly is disposed in the inlet, is selectively engaged with the sealing tip, and comprises a nozzle, a first dielectric interface, a nut, and a second dielectric interface. The nozzle has a shoulder. The first dielectric interface is disposed about the nozzle and engaged with the shoulder. The nut is disposed about the first dielectric interface and compresses the first dielectric interface against the shoulder. The second dielectric interface is disposed in the nut and is in contact with the first dielectric interface. The inlet fitting is threadably engaged with the nut and compresses the second dielectric interface against the nozzle and the first dielectric interface.

In a third example, an apparatus comprises a regulator to regulate fluid flow, a nozzle assembly, and an inlet fitting. The regulator has an inlet. The nozzle assembly comprises a nozzle, first and second dielectric interfaces, and a nut. The nozzle is disposed in the inlet and has a funnel void. The first and second dielectric interfaces are engaged with the nozzle. The nut is rotatably engaged with the first dielectric interface. The second dielectric interface is disposed in the nut. The inlet fitting is threadably engaged with the nut to compress the first and second dielectric interfaces against the nozzle and is in fluid communication with the inlet via the funnel void.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In some, but not all embodiments, some or all of the drawings are scaled. In addition, system components can be variously arranged, as known in the art. Further, in the drawings, like reference numerals designate corresponding parts throughout the several views.

DETAILED DESCRIPTION

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated. It should be appreciated that when the claims recite dimensional relationships (e.g., fully occupy), such relationships include manufacturing tolerances.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

FIGS. 1-5 generally show and illustrate a first embodiment of a dielectric regulator 100. FIGS. 6 to 9 generally show and illustrate alternative embodiments of the dielectric regulator 100. The dielectric regulator 100 is configured to intake fluid of varying pressure and flow rate, and then supply the fluid at a constant pressure. The dielectric regulator 100 may intake fluid from a utility fluid line (such as a natural gas line) outside of a home. The dielectric regulator 100 is then configured to deliver the fluid to appliances (e.g., stoves, furnaces, boilers, grills) inside of the home.

As these appliances are turned on and off, the total amount of fluid required from the utility fluid line varies. By maintaining a generally constant supply pressure, the dielectric regulator 100 ensures that each appliance receives an appropriate supply of fluid. Furthermore, the pressure of fluid in the utility fluid line may vary unexpectedly. The dielectric regulator 100 ensures that the pressure of fluid flowing inside of the home is independent of (i.e., does not vary with) the pressure of fluid in the utility line.

Figure 1:
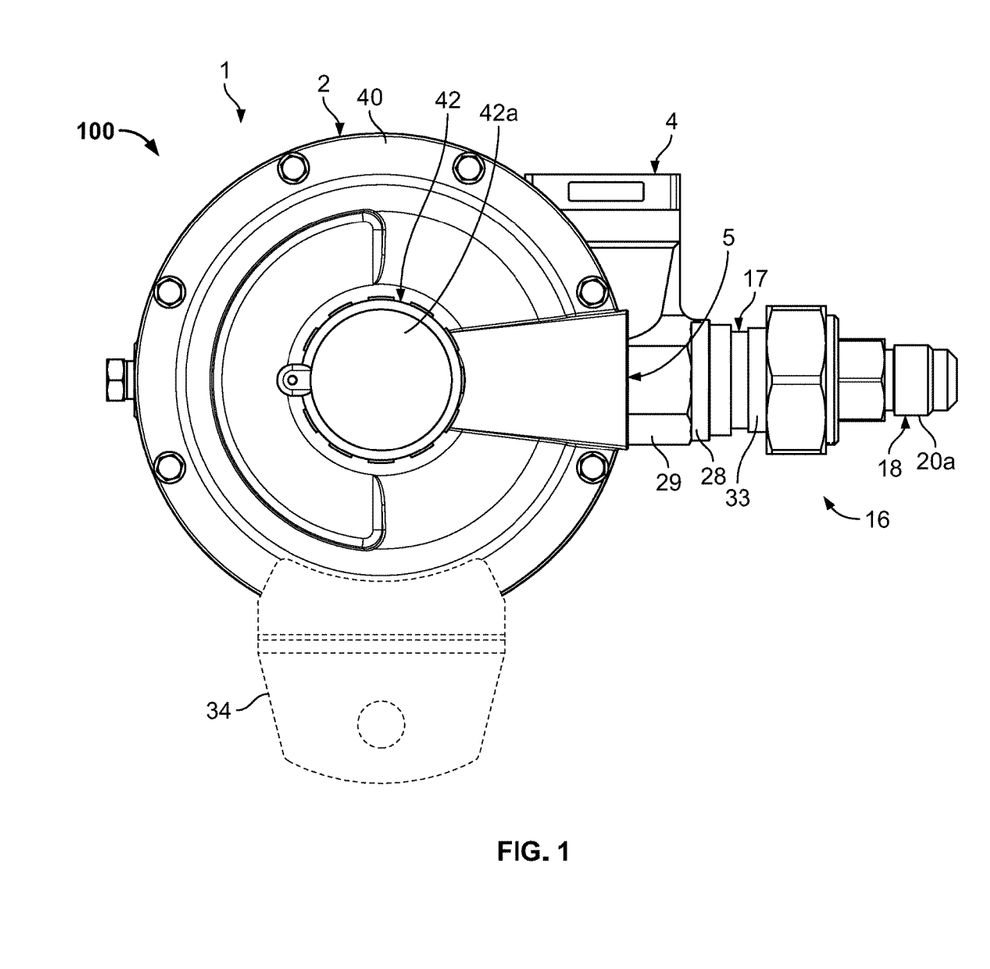
FIG. 1 is a top view of a dielectric regulator.

As shown in FIG. 1, dielectric regulator 100 generally includes a regulator 1 and an inlet group 16. Inlet group 16 is configured to intake fluid from the utility fluid line and provide a dielectric interface between the utility fluid line and regulator 1. Regulator 1 is configured to ensure that fluid received from the utility fluid line via inlet group 16 is delivered at a generally constant pressure.

Figure 2:
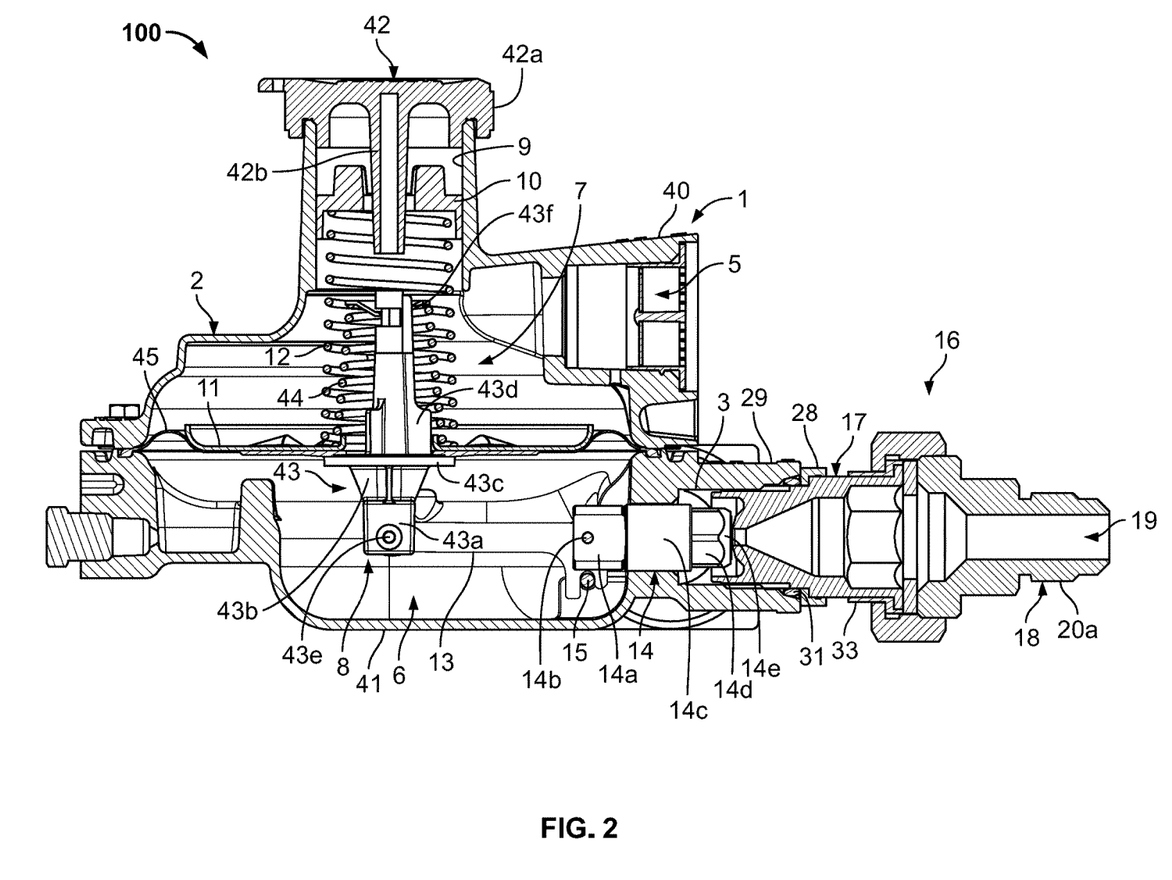
FIG. 2 is a cross sectional view of the dielectric regulator of FIG. 1.

As shown in FIG. 2, regulator 1 includes a body 2 and a diaphragm assembly 8. Body 2 serves as a housing for regulator 1 and generally includes a lower body 41, a bonnet 40, and an end cap 42. Lower body 41 is joined and securely fastened to bonnet 40. End cap 42 includes a sealing portion 42a with external threads received in corresponding internal threads 9 of bonnet 40. End cap 42 includes a post 42b configured to contact a top of a yoke assembly 43 (discussed in greater detail below). Body 2 includes or defines an inlet 3, an outlet 4, a vent 5, and defines a first void 6 that serves as a fluid passage between inlet 3 and outlet 4, and a second void 7 that serves as a fluid passage between first void 6 and vent 5. Regulator 1 may optionally include a mounting tab 34, as shown in phantom in FIG. 1.

Diaphragm assembly 8 is located inside of body 2 and is configured to: (a) vary an amount of fluid received from inlet 3 into first void 6, (b) selectively enable venting of fluid from first void 6 into atmosphere via vent 5. Diaphragm assembly 8 includes an adjustable spring seat 10 threaded into internal threads 9; a yoke assembly 43; a diaphragm plate 11 fastened to body 2 via a diaphragm 45, and configured to selectively separate first void 6 from second void 7; an arm 13 in mechanical communication with yoke assembly 43 on one end, a sealing block assembly 14 on the other end, pivotable about a pin 15 attached to lower body 41, and configured to vertically slide in yoke assembly 43; a first or outer spring 12 configured to regulate horizontal position of sealing block assembly 14 via arm 13; and a conical second or inner spring 44 configured to selectively enable venting (i.e., fluid communication between first void 6 and second void 7) by regulating vertical position of diaphragm plate 11 and/or diaphragm 45 with respect to yoke assembly 43.

Sealing block assembly 14 is configured to horizontally slide within lower body 41 and to selectively open and close inlet 3. Sealing block assembly 14 includes a connection block 14a joined to arm 13 via a pin 14b, a fitting block 14c, a sealing block 14d, and a sealing tip 14e fastened to sealing block 14d. Sealing block assembly 14 is generally integral and configured to horizontally slide in lower body 41 as a unit. Arm 13 actuates horizontally sliding of sealing block assembly 14 via pin 14b, which extends through connection block 14a into arm 13. Tip 14e of sealing block 14d is configured to selectively compress against an inlet nozzle assembly 17 of inlet group 16. When tip 14e of sealing block 14d compresses against inlet nozzle assembly 17, fluid communication between the utility fluid line and first void 6 is disabled. When tip 14e of sealing block 14d retreats from inlet nozzle assembly 17, fluid communication between the utility fluid line and first void 6 is enabled. To encourage tight compression, tip 14e may be a polymer such as a plastic or a rubber. The remainder of sealing block assembly 14 may be metallic.

Fitting block 14c has first edges with an radius substantially equal to (although slightly less than) a first inner radius of a first inner circumference of inlet 3. The contact or interface between the first edges of fitting block 14c and the first inner circumference of inlet 3 discourage or substantially prevent fitting block 14c from rotating or transversely sliding (i.e., in the direction extending into and out of the page in FIG. 2) in inlet 3. Put differently, the contact or interface between first edges of fitting block 14c and the first inner circumference of inlet 3 encourage sealing block assembly 14 to only slide or move horizontally.

Adjacent first edges of fitting block 14c define grooves or recesses therebetween. The radial distance from the longitudinal centerline of fitting block 14c to the middle of the grooves or recesses is less than the radial distance from the longitudinal centerline of fitting block 14c to the tips of the first edges. The grooves or recesses thus enable fluid flow between the first inner circumference of inlet 3 and the outer surfaces of fitting block 14c. It should thus be appreciated that fitting block 14c may have a cross section (taken in a direction perpendicular to the cross section of FIG. 2) resembling a flower with pedals or a gear shaft with splines. The first edges of fitting block 14c correspond to the pedals or the splines. The grooves or recesses defined between the first edges of fitting block 14c correspond to the gaps between the pedals or the splines.

Yoke assembly 43 is configured to actuate sealing block assembly 14 via arm 13. Yoke assembly 43 includes a joining block 43a, a widening block 43b, a seat 43c, a stem 43d, and a spring retainer 43f. Joining block 43a defines a vertical (i.e., along the major axis of stem 43d) groove. In other embodiments, the groove is circular. The groove receives a yoke pin 43e transversely (i.e., in the direction extending into and out of the page in FIG. 2) extending from arm 13. The yoke pin 43e rests at the bottom of or inside the groove. Arm 13 rotates about the pin. When pressure in first void 6 is low, yoke assembly 43 shifts vertically downward from the position shown in FIG. 2. Arm 13 thus slants upwards from joining block 43a to connection block 14a. When pressure in first void is high, yoke assembly 43 shifts vertically upward to the position shown in FIG. 2. Arm 13 is thus perpendicular to joining block 43a, causing sealing tip 14e of sealing block assembly 14 to compress against inlet nozzle assembly 17 of inlet group 16.

Seat 43c connects to joining block 43a via widening block 43b. Seat 43c is generally cylindrical with an outer diameter exceeding a corresponding inner diameter of an inner void centrally defined in diaphragm plate 11. Diaphragm plate 11 is thus configured to selectively compress against seat 43c. When pressure in first inner void 6 is below a predetermined venting pressure, diaphragm plate 11 compresses against seat 43c thus preventing fluid communication between first void 6 and second void 7. When pressure in first inner void 6 exceeds the predetermined venting pressure, diaphragm 45 lifts diaphragm plate 11 above seat 43c, thus enabling fluid communication between first inner void 6 and second inner void 7. Second inner void 7 is in constant fluid communication with vent 5. Thus, when fluid communication between first inner void 6 and second inner void 7 is enabled, fluid flows from first inner void 6 to second inner void 7 and from second inner void 7 to ambient atmosphere via vent 5.

Stem 43d, similar to sealing block 14d, has outer edges in contact with an inner circumference of diaphragm plate 11 and recesses defined between the edges. The outer edges of stem 43d keep stem 43d vertically aligned with respect to diaphragm plate 11. The recesses defined between the edges enable fluid flow from first void 6 to second void 7 when diaphragm plate 11 releases from seat 43c. Spring retainer 43f is fixed to stem 43d and is in compressive contact with second or inner spring 44.

Diaphragm plate 11 is made from a rigid material, such as a metal and receives a lower end of both of first or outer spring 12 and second or inner spring 44. Diaphragm 45 is made from a flexible material, such as a polymer. When pressure in first void 6 is high, diaphragm 11 flexes vertically upward, as shown in FIG. 2, thus opposing the downward biasing compressive force of first or outer spring 12. The vertically upward flex of diaphragm 45 draws diaphragm plate 11 upward. As diaphragm plate 11 moves upwards, the compressive force of second or inner spring 44 increases against spring retainer 43f. Assuming that the pressure in first void 6 is below the predetermined venting pressure, second or inner spring 44, by virtue of force exerted against spring retainer 43f, keeps seat 43c in compressive contact with diaphragm plate 11.

When pressure in first void 6 is low, diaphragm 45 flexes vertically downward (not shown) to occupy its unbiased or lowest energy state. As a result, force exerted from diaphragm plate 11 against the opposing biasing force of first or outer spring 12 decreases. First or outer spring 12 thus biases diaphragm plate 11 vertically downward. As diaphragm plate 11 moves vertically downward, diaphragm plate 11 pushes seat 43c (and thus yoke assembly 43) vertically downward. Second or inner spring 44 keeps diaphragm plate 11 in compressive engagement with seat 43c to discourage venting. As previously explained, when seat 43c vertically lowers, arm 13 rotates about yoke pin 43e and pivots about pin 15. As a result, sealing block assembly 14 horizontally slides or translates toward yoke assembly 43, releasing tip 14e from compressive engagement against inlet group 16. Fluid may now flow from the utility line, through inlet group 16, between inlet 3 and sealing block assembly 14, into first void 6, and into the home via outlet 4.

In this way, regulator 1 ensures that fluid received from the utility fluid line via inlet group 16 is delivered, via outlet 4, at a generally constant pressure. As stated above, adjustable spring seat 10 is threaded into internal threads 9 of bonnet 40. A user may control the generally constant delivery pressure by adjusting the vertical position of adjustable spring seat 10 with respect to internal threads 9.

As shown in FIG. 2 and as previously discussed, end cap 42 includes a post 42b. As pressure in void 6 increases, a vertical top of stem 43d moves closer to a vertical bottom of post 42b. Eventually, the vertical top of stem 43d contacts the vertical bottom of post 42b, thus arresting vertical translation of yoke assembly 43 in the upward direction. When pressure in first void 6 exceeds the predetermined venting pressure, diaphragm plate 11 (by virtue of lift provided from diaphragm 45) continues to oppose the biasing forces of first and second springs 12 and 44. Thus, diaphragm plate 11 continues to translate vertically upwards toward sealing portion 42a of end cap 42. This upward motion increases the biasing force of inner spring 44 against spring retainer 43f. However, post 42b has now arrested the upward vertical translation of yoke assembly 43. As a result, seat 43c cannot further vertically translate to remain in compressive contact with diaphragm plate 11. When seat 43c releases from compressive contact with diaphragm plate 11, fluid flows from first void 6, between outer surfaces of stem 43d and the corresponding inner surface of diaphragm plate 11 defining the central diaphragm hole, into second void 7, and out to ambient atmosphere via vent 5.

Figure 3:
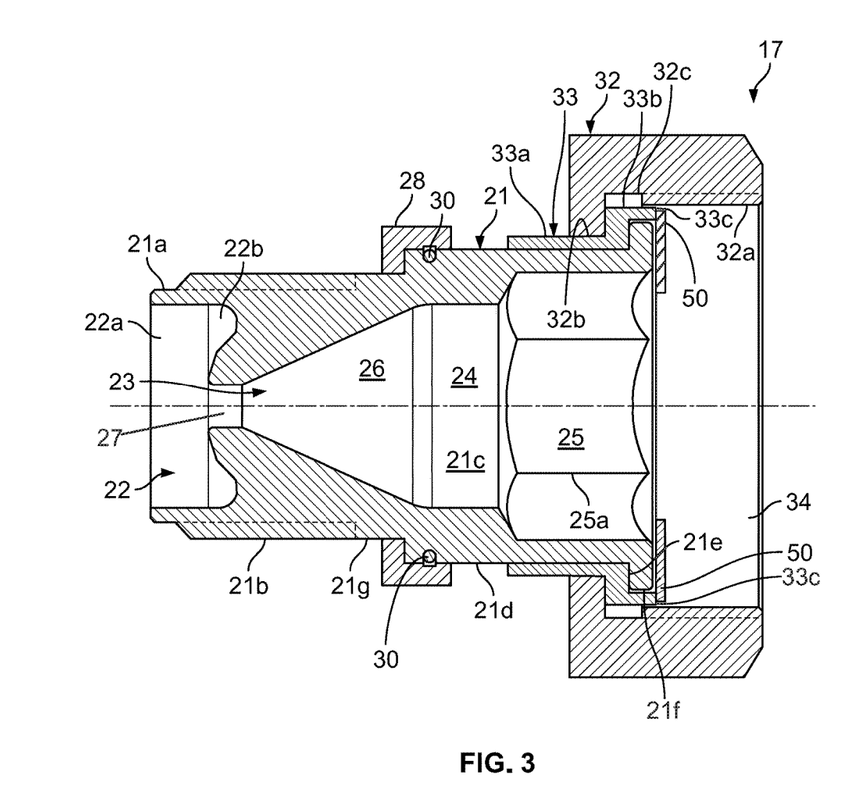
FIG. 3 is a cross sectional view of an inlet nozzle assembly of the dielectric regulator of FIG. 1.

The structure and operation of inlet group 16 will now be described with reference to FIGS. 2, 3, and 4. Inlet group 16 is configured to provide a dielectric break between the utility fluid line and regulator 1. Inlet group 16 includes inlet nozzle assembly 17 joined with an inlet fitting 18.

Inlet fitting 18 is configured to attach to the utility fluid line. Inlet fitting 18 defines a central void 19 and includes first outer threads 20a configured to thread into the utility fluid line and second outer threads 20b configured to thread into nut 32. As shown in FIG. 4, inlet fitting 18 defines four portions of central void 19. A first void portion 19a is generally cylindrical with a constant diameter. A second void portion 19b resembles a trapezoidal cone (i.e., is conical) and with a linearly increasing diameter. The smallest diameter of second void portion 19b is equal to the diameter of first void portion 19a. A third void portion 19c is generally cylindrical with a constant diameter equal to the largest diameter of second void portion 19b. A fourth void portion 19d resembles a trapezoidal cone (i.e., is conical) with a linearly increasing diameter. The smallest diameter of fourth void portion 19d is equal to the diameter of third void portion 19c.

Figure 4:
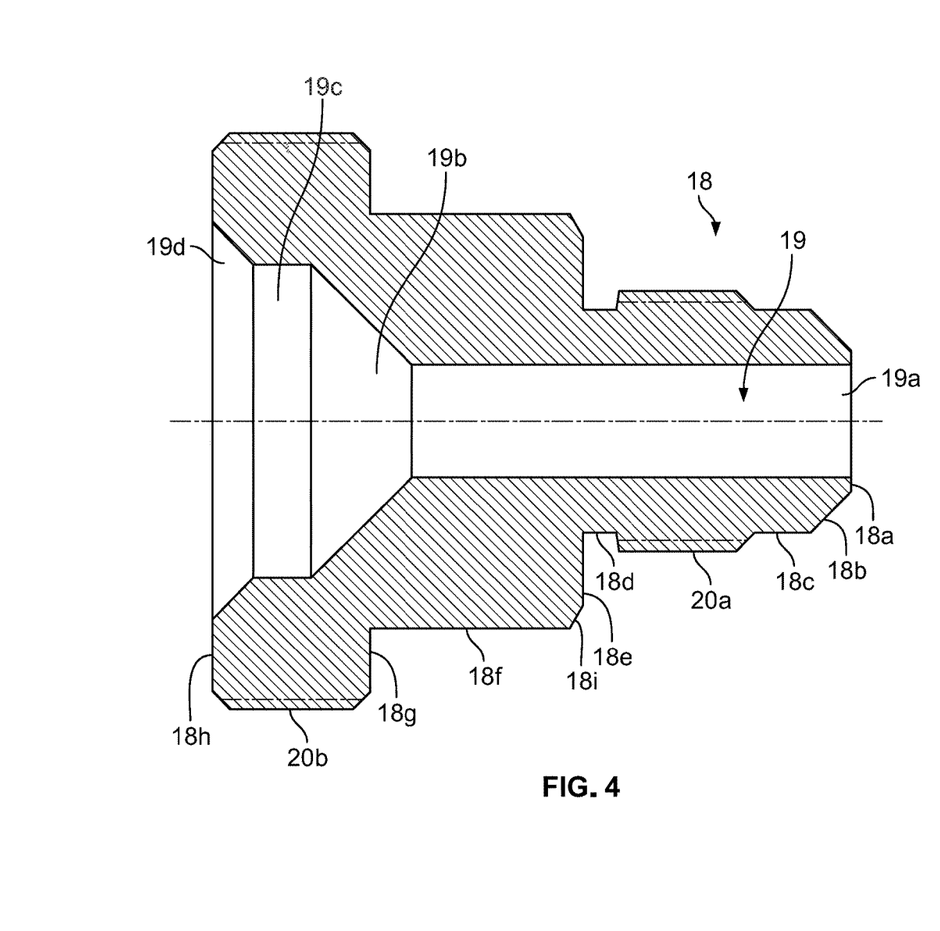
FIG. 4 is a cross sectional view of a first embodiment of an inlet fitting of the dielectric regulator of FIG. 1.

As shown in FIG. 4, inlet fitting 18 includes a forward facing surface 18a, a slanted surface 18b, a first cylindrical extension portion 18c, first outer threads 20a, a second cylindrical extension portion 18d, a first shoulder 18e, a third cylindrical extension portion 18f, a second shoulder 18g, and a rear facing surface 18h. As shown in FIG. 4, first shoulder 18e may include a slanted portion 18i.

Inlet nozzle assembly 17 is configured to filter incoming fluid and deliver a narrow stream of the incoming fluid to sealing tip 14e. With reference to FIGS. 2 and 3, inlet nozzle assembly 17 includes a nozzle 21, a bushing 28, a first sealing ring 30, a second sealing ring 31, a nut 32, a first dielectric interface 33, and a second dielectric interface 50.

Nozzle 21 defines a sealing block void 22, a funnel void 23, a first cylindrical void 24, and a polygonal void 25. Funnel void 23 includes a trapezoidal cone (i.e., conical) void portion 26 and a tip void portion 27. Conical void portion 26 narrows from first cylindrical void 24 to tip void portion 27. A diameter of conical void portion linearly decreases from first cylindrical void 24 to tip void portion 27. Tip void portion 27, like first cylindrical void 24, has a constant diameter. Sealing block void 22 includes a cylindrical portion 22a with a constant diameter and a recessed portion 22b. Recessed portion 22b is donut-shaped and includes a generally constant outer diameter and an inner diameter that begins at cylindrical portion 22a and increases in the horizontal direction toward first cylindrical void 24. A polygonal filter 25a occupies the polygonal void 25. Nozzle 21 includes a narrow outer surface 21a, external threads 21b, a first shoulder 21c, a first cylindrical portion 21d, a second shoulder 21e, and a second cylindrical portion 21f. A third cylindrical portion 21g extends between external threads 21b and first shoulder 21c.

Bushing 28 surrounds a first outer perimeter of nozzle 21. The first outer perimeter of nozzle 21 includes first shoulder 21c, first cylindrical portion 21d, and third cylindrical portion 21g. A horizontal facing surface of bushing 28 is in direct contact with a portion 29 of body 2 defining inlet 3 and with second sealing ring 31. Bushing 28 compresses first sealing ring 30, which surrounds the first outer perimeter of nozzle 21, between the first outer perimeter of nozzle 21 and bushing 28. Second sealing ring 31 surrounds a second outer perimeter of nozzle 21 and is compressed between (a) the second outer perimeter of nozzle 21, (b) portion 29 of body 2 defining inlet 3, and (c) bushing 28.

Nut 32 includes inner threads 32a, a first inner surface 32b, and a second inner surface 32c. Inner threads 32a receive second outer threads 20b of inlet fitting 18. First inner surface 32b compresses against first dielectric interface 33. Second inner surface 32c has an inner diameter exceeds first inner surface 32b and does not compress or contact first dielectric interface 33. Inner threads 32a, like first inner surface 32b, compress against first dielectric interface 33 against nozzle 21.

First dielectric interface 33 is ring-shaped with a first portion 33a having generally constant inner and outer diameters, a second portion 33b with an inner diameter equal to the inner diameter of first portion 33a and an outer diameter exceeding the outer diameter of first portion 33a, and a third portion 33c having an inner diameter exceeding the inner diameter of second portion 33b, and an outer diameter equal to the outer diameter of second portion 33b. In other words, the second portion 33b forms a transitional flange between the narrower first portion 33a and the wider third portion 33c. As shown in FIG. 3, a cross section of the combination of second portion 33b and third portion 33c is L-shaped. First dielectric interface 33 contacts first cylindrical portion 21d and second shoulder 21e. In some embodiments, first dielectric interface 33 is sized to not contact (i.e., form a gap between) second cylindrical portion 21f.

Second dielectric interface 50 is ring shaped with generally constant inner and outer diameters. Second dielectric interface 50 is sized, shaped, and configured to compress against (a) third portion 33c of first dielectric interface 33, (b) nozzle 21 (but not inner threads 32a of nut 32), and (c) inlet fitting 18.

Dielectric interfaces 33 and 50 are made from a dielectric material, such as a plastic or rubber. Dielectric interfaces 33 and 50 substantially prevent or discourage electrical communication from inlet fitting 18 and nut 32 to nozzle 21. In other words, the first and second dielectric interfaces 33, 50 electrically insulate (a) the nut 32 and the nozzle 21 from one another and (b) the inlet fitting 18 and the nozzle 21 from one another. Thus, an electrical current is substantially prevented from passing from the inlet fitting 18 to the nozzle 21 and vice versa. In various embodiments, first sealing ring 30 and/or second sealing ring 31 are made from dielectric material.

Figure 5:
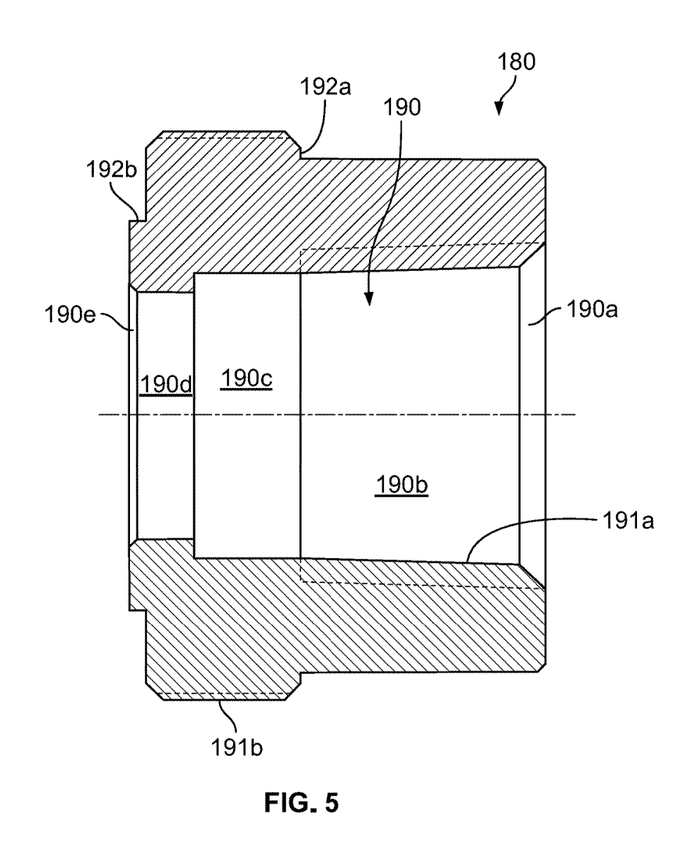
FIG. 5 is a cross sectional view of a second embodiment of the inlet fitting of the dielectric regulator of FIG. 1.
Figure 6:
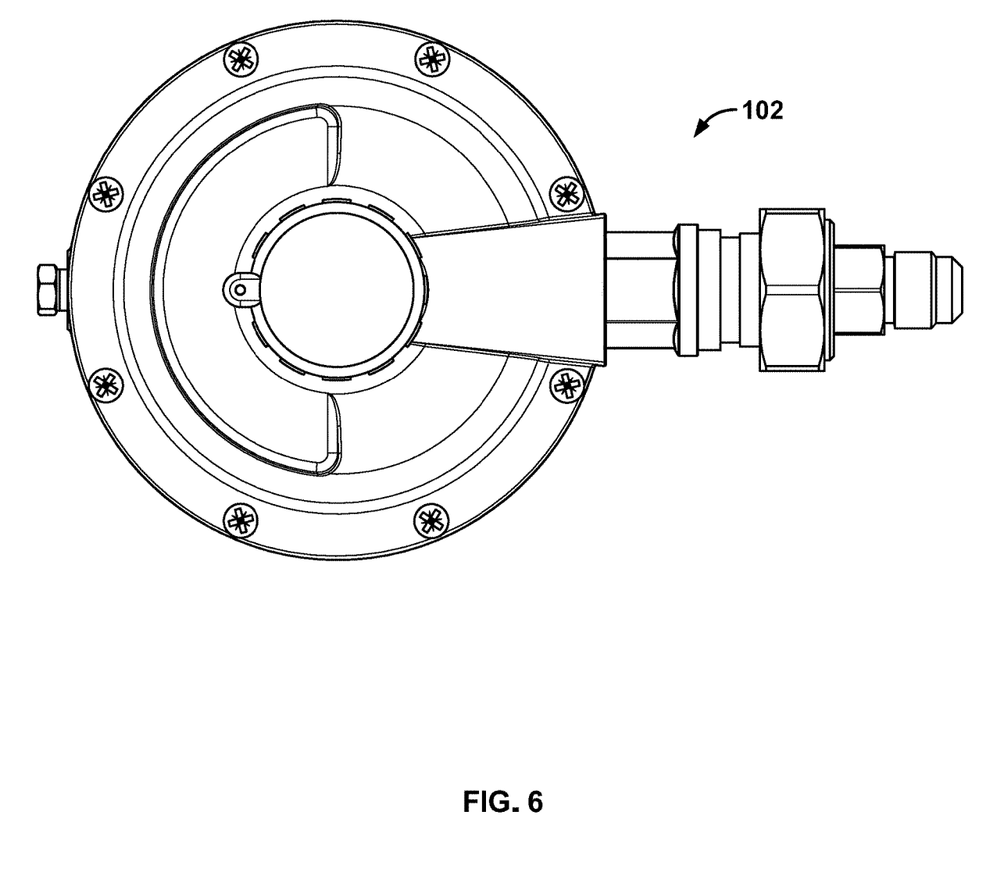
FIG. 6 is a top view of a second embodiment of the dielectric regulator.
Figure 7:
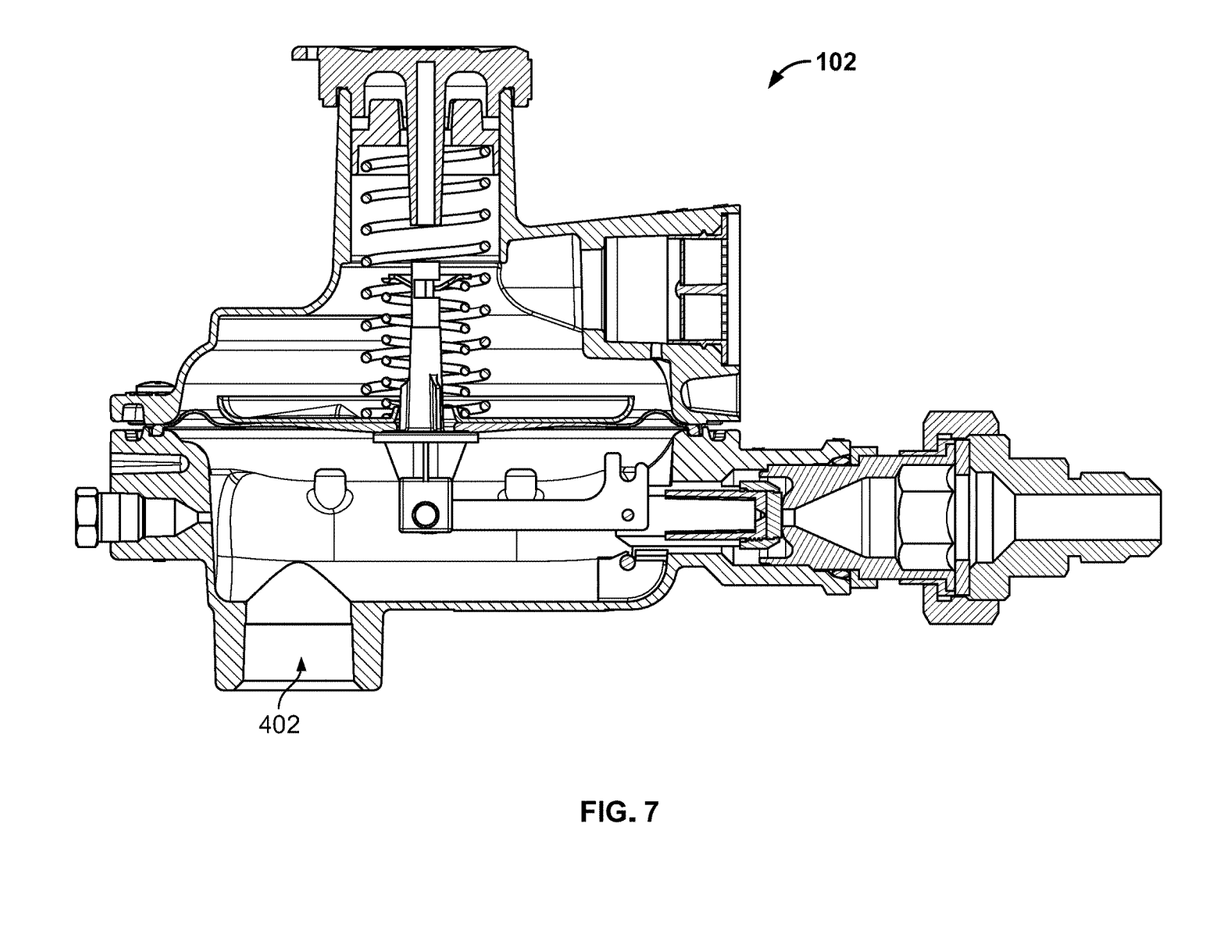
FIG. 7 is a cross sectional view of the second embodiment of the dielectric regulator of FIG. 6.
Figure 8:
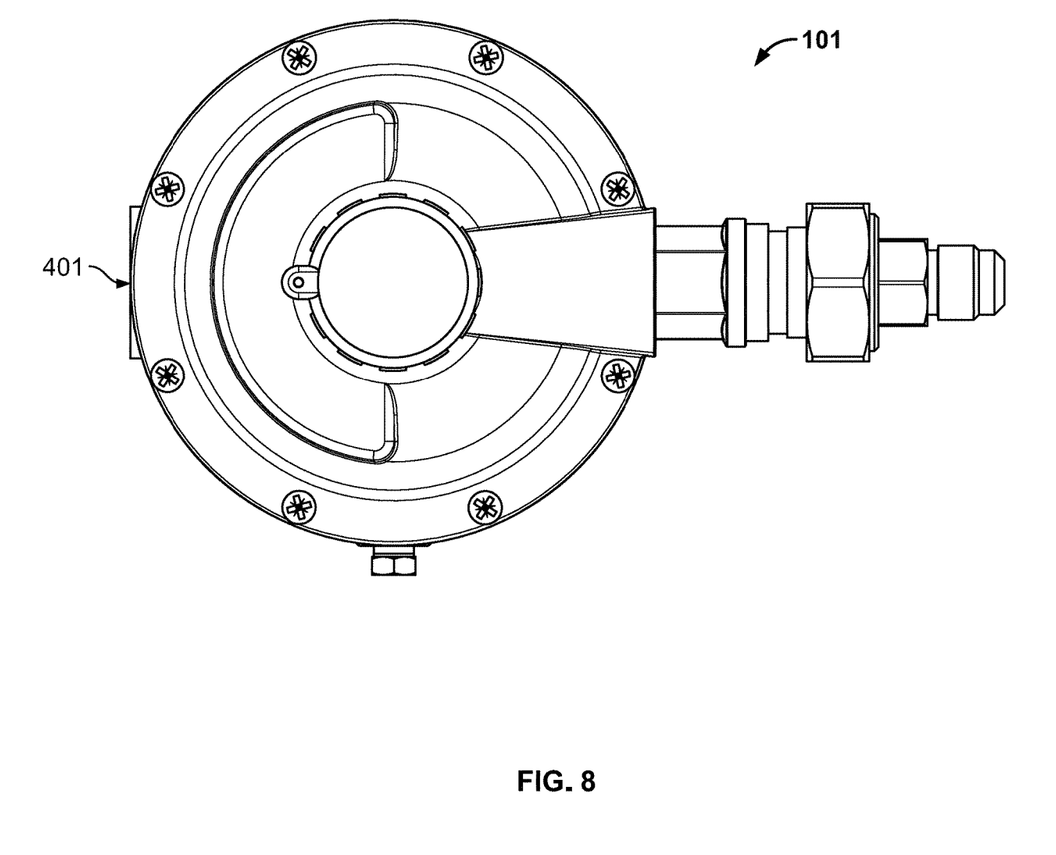
FIG. 8 is a top view of a third embodiment of the dielectric regulator.
Figure 9:
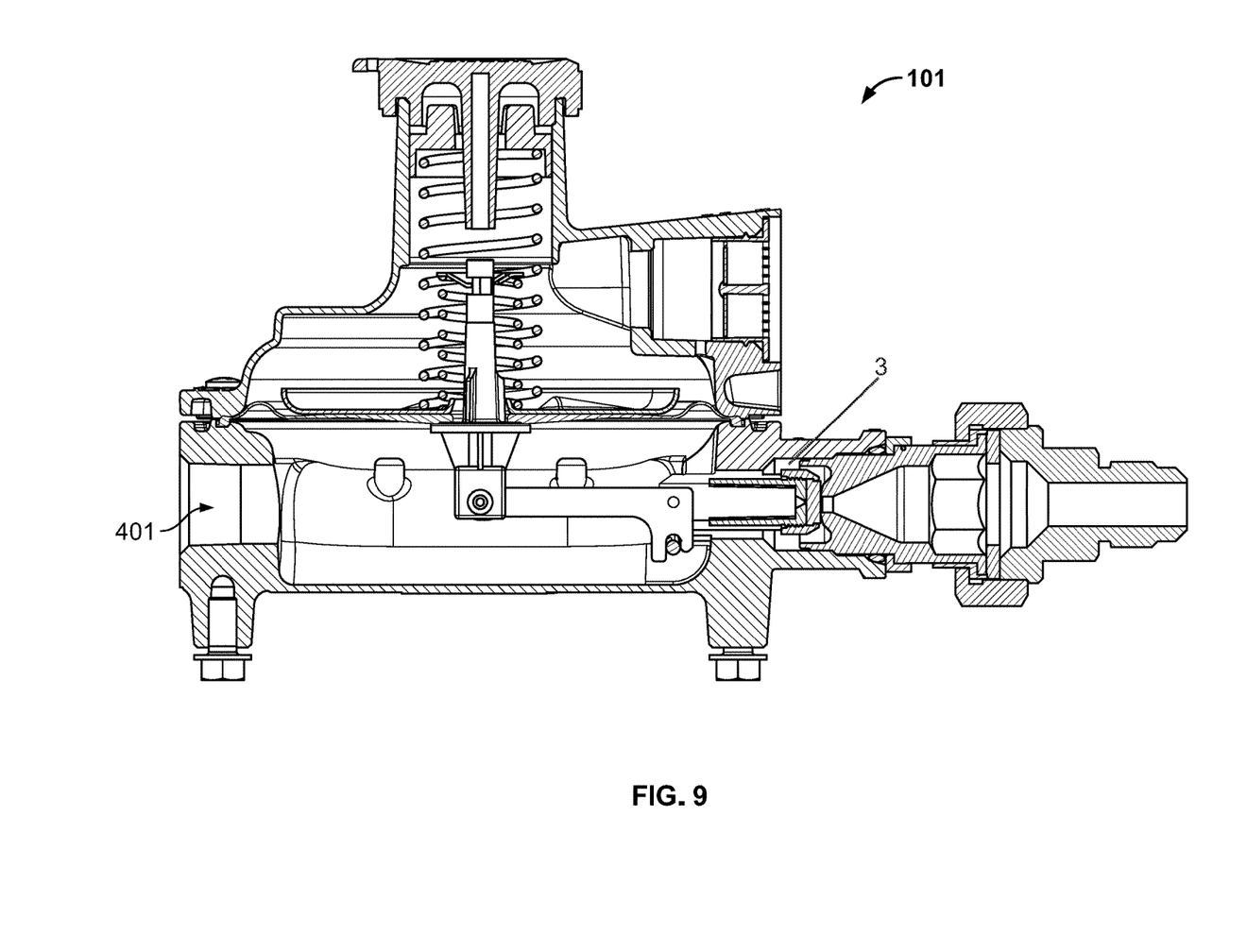
FIG. 9 is a cross sectional view of the third embodiment of the dielectric regulator of FIG. 8.

A second inlet fitting embodiment 180 is generally shown and illustrated in FIG. 5. Second inlet fitting 180 is interchangeable with original inlet fitting 18 and thus any of the disclosed embodiments may include original inlet fitting 18 or second inlet fitting 180. Second inlet fitting 180, like original inlet fitting 18, is configured to thread into nut 32.

Second inlet fitting 180 includes inner threads 191a, outer threads 191b, and defines a central void 190. Inner threads 191a receive corresponding outer threads of the utility gas line. Outer threads 191b thread into nut 32. Central void 190 includes a first void portion 190a, a second void portion 190b, a third void portion 190c, a fourth void portion 190d, and a fifth void portion 190e.

First void portion 190a resembles a trapezoidal cone (i.e., is conical) with a diameter that linearly decreases from one end of second inlet fitting 180 to second void portion 190b. Second void portion 190b has a diameter defined between inner-most tips of inner threads 191a. The diameter of second void portion 190b narrows from first void portion 190a to third void portion 190c. The largest diameter of second void portion 190b equals the smallest diameter of first void portion 190a. Third void portion 190c has a constant diameter. Fourth void portion 190d has a constant diameter larger than the diameter of third void portion 190c. Fifth void portion 190e has a diameter that linearly increases from fourth void portion 190d to a second end of second inlet fitting 180. The smallest diameter of fifth void portion 190e equals the diameter of fourth void portion 190d. As shown in FIG. 5, second inlet fitting 180 includes a first step 192a and a second step 192b.

FIGS. 6-9 show various alternative embodiments 101 and 102 of dielectric regulator 100. These alternative embodiments 101 to 102 operate similar to dielectric regulator 100 and the details and explanation of dielectric regulator 100 apply to the alternative embodiments 101 and 102. A second embodiment 101 replaces outlet 4 with an outlet 401 horizontally opposed to inlet 3. A third embodiment 102 replaces outlet 4 with an outlet 402 defined in a bottom of body 2.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

The invention claimed is:

1. A dielectric regulator comprising:
   a regulator comprising:
      a body having an inlet; and
      a sealing tip disposed in the inlet; and
   an inlet group comprising:
      an inlet nozzle assembly disposed in the inlet to selectively engage with the sealing tip, the inlet nozzle assembly comprising:
         a nozzle defining a sealing block void, a funnel void, a first cylindrical void, and a polygonal void;
         a bushing surrounding a first outer perimeter of the nozzle;
         a first sealing ring compressed between the first outer perimeter of the nozzle and the bushing;
         a second sealing ring surrounding a second outer perimeter of the nozzle and compressively contacting the second outer perimeter and the bushing;
         a nut rotatably disposed about the nozzle;
         a first ring-shaped dielectric interface configured to be compressed between the nut and the nozzle; and
         a second ring-shaped dielectric interface in contact with the first ring-shaped dielectric interface; and
      an inlet fitting defining a central void and threadably attached to the nozzle via the nut, the inlet fitting to compress the second ring-shaped dielectric interface against the nozzle and the first ring-shaped dielectric interface.

2. The dielectric regulator of claim 1, wherein the inlet group is configured to deliver fluid at a variable pressure and flow rate to the regulator and the regulator is configured to deliver fluid at a constant pressure.

3. The dielectric regulator of claim 1, wherein the regulator abuts the bushing to compress the first sealing ring.

4. The dielectric regulator of claim 1, wherein the second sealing ring is in compressive contact with the regulator.

5. The dielectric regulator of claim 1, wherein the first dielectric interface and the second dielectric interface electrically insulate the nut and the nozzle.

6. The dielectric regulator of claim 1, wherein the first dielectric interface includes a first portion, a second portion, and a third portion, the first portion being narrower than the third portion, the second portion forming a transitional flange between the first portion and the third portion and being compressed between the nut and a shoulder of the nozzle.

7. The dielectric regulator of claim 1, wherein the polygonal void is configured to receive a tool to threadably engage the nozzle with the body.

8. A dielectric regulator comprising:
   a regulator comprising:
      a body having an inlet; and
      a sealing tip disposed in the inlet; and
   an inlet group comprising:
      a nozzle assembly disposed in the inlet, selectively engaged with the sealing tip, and comprising:
         a nozzle having a shoulder;
         a first dielectric interface about the nozzle and engaged with the shoulder;
         a nut about the first dielectric interface, the nut compressing the first dielectric interface against the shoulder; and
         a second dielectric interface disposed in the nut and in contact with the first dielectric interface; and
      an inlet fitting threadably engaged with the nut and compressing the second dielectric interface against the nozzle and the first dielectric interface.

9. The dielectric regulator of claim 8, wherein the nozzle assembly comprises a first sealing ring about the nozzle and a bushing about the nozzle and compressively engaged with the first sealing ring.

10. The dielectric regulator of claim 9, wherein the nozzle has a second shoulder, the bushing being engaged with the second shoulder.

11. The dielectric regulator of claim 9, wherein the regulator abuts the bushing to compress the first sealing ring.

12. The dielectric regulator of claim 9, wherein the nozzle assembly comprises a second sealing ring about the nozzle and compressively engaged with the regulator and the bushing.

13. The dielectric regulator of claim 8, wherein the first dielectric interface and the second dielectric interface electrically insulate the nut and the nozzle.

14. The dielectric regulator of claim 8, wherein the nozzle has a polygonal void in fluid communication with the inlet fitting and a funnel void in fluid communication with the polygonal void and with the sealing tip.

15. A dielectric regulator comprising:
   a regulator to regulate fluid flow comprising:
      a body having an inlet; and
      a sealing tip disposed in the body; and
   a nozzle assembly partially disposed in the inlet to selectively engage with the sealing tip, the nozzle assembly comprising:
      a nozzle having a funnel void;
      first and second dielectric interfaces engaged with one another and the nozzle;
      a nut rotatably engaged with the first dielectric interface, the second dielectric interface being disposed in the nut; and
   an inlet fitting threadably engaged with the nut to compress the first and second dielectric interfaces against the nozzle and in fluid communication with the inlet via the funnel void.

16. The dielectric regulator of claim 15, wherein the funnel void has a tip void portion and a cone void portion, the tip void portion being disposed deeper in the inlet than the cone void portion.

17. The dielectric regulator of claim 15, wherein the nozzle is configured to receive a tool to threadably engage the nozzle with the body.

18. The dielectric regulator of claim 15, wherein the nozzle assembly comprises first and second sealing rings about the nozzle and a bushing about the first sealing ring.

19. The dielectric regulator of claim 18, wherein the bushing abuts the regulator to compress the first sealing ring and the second sealing ring is compressed between the regulator, the nozzle, and the bushing.

20. The dielectric regulator of claim 15, wherein the first and second dielectric interfaces electrically insulate the nozzle from the inlet fitting and from the nut.

* * * * *